United States Patent
Park et al.

(10) Patent No.: US 9,134,857 B2
(45) Date of Patent: Sep. 15, 2015

(54) ADAPTIVE DIGITAL FILTERING METHOD AND APPARATUS IN TOUCH SENSING SYSTEM

(75) Inventors: Jong-kang Park, Suwon-si (KR); Hae-yong Ahn, Seoul (KR); Yoon-kyung Choi, Yongin-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 489 days.

(21) Appl. No.: 13/103,257

(22) Filed: May 9, 2011

(65) Prior Publication Data

US 2011/0285654 A1 Nov. 24, 2011

(30) Foreign Application Priority Data

May 20, 2010 (KR) .................. 10-2010-0047644

(51) Int. Cl.
*G06F 3/044* (2006.01)
*G06F 3/041* (2006.01)

(52) U.S. Cl.
CPC .............. *G06F 3/044* (2013.01); *G06F 3/0418* (2013.01); *G06F 3/041* (2013.01)

(58) Field of Classification Search
CPC ..... G06F 3/0488; G06F 3/044; G06F 3/0421; G06F 3/0436; G06F 3/0418; G06F 3/045
USPC ...................... 345/173–178; 178/18.01–18.06
See application file for complete search history.

(56) References Cited

U.S. PATENT DOCUMENTS

| | | | |
|---|---|---|---|
| 5,909,384 A * | 6/1999 | Tal et al. .................. | 708/322 |
| 7,292,229 B2 | 11/2007 | Morag et al. | |
| 8,217,918 B2 | 7/2012 | Morag et al. | |
| 8,253,697 B2 | 8/2012 | Fleck et al. | |
| 2003/0128692 A1* | 7/2003 | Mitsumori et al. ........ | 370/352 |
| 2004/0052384 A1* | 3/2004 | Ashley et al. ............. | 381/94.1 |
| 2004/0095333 A1* | 5/2004 | Morag et al. ............. | 345/173 |
| 2007/0085911 A1* | 4/2007 | Nakamura ................ | 348/223.1 |
| 2007/0261895 A1* | 11/2007 | Knowles et al. .......... | 178/18.04 |
| 2009/0078474 A1* | 3/2009 | Fleck et al. .............. | 178/18.02 |

FOREIGN PATENT DOCUMENTS

| | | |
|---|---|---|
| CN | 1567165 A | 1/2005 |
| CN | 100440309 C | 12/2008 |
| CN | 101441530 A | 5/2009 |
| JP | 09325852 | 12/1997 |
| JP | 2006106853 A | 4/2006 |
| KR | 1020000052152 A | 8/2000 |

OTHER PUBLICATIONS

Chinese Office Action Dated Nov. 19, 2014 in Corresponding Application No. CN201110131640.2.

* cited by examiner

*Primary Examiner* — Quan-Zhen Wang
*Assistant Examiner* — Chad Dicke
(74) *Attorney, Agent, or Firm* — Volentine & Whitt, PLLC (57) ABSTRACT

An adaptive digital filtering method and apparatus for touch data in a touch system is described. Adaptive digital filtering involves estimating a signal-to-noise ratio (SNR) for stored touch data, and reducing a digital filter order if the SNR is high and increasing the digital filter order if the SNR is small.

13 Claims, 10 Drawing Sheets

ADAPTIVE DIGITAL FILTERING METHOD AND APPARATUS IN TOUCH SENSING SYSTEM

CROSS-REFERENCE TO RELATED APPLICATIONS

This application claims the benefit of Korean Patent Application No. 10-2010-0047644, filed on May 20, 2010, the subject matter of which is hereby incorporated by reference in its entirety.

BACKGROUND OF THE INVENTION

The inventive concept relates to systems employing a touch display, such as a touch panel. In such systems, it is important to increase the touch sensitivity of the touch display. In order to maximize touch sensitivity, it is important to filter touch data to reduce noise generated within the touch display system.

In general, a touch display is an input device providing an interface between a user and an information and/or communication system. The user directly contacts the touch display (i.e., provides a "touch input") using a touch input device (e.g., his/her finger or an input tool such as a pen or stylus) to indicate user input information. Contemporary examples of touch displays include touch screens, such as liquid crystal display (LCD) devices, field emission display (FED) devices, organic light-emitting display (OLED) devices, and plasma display panel (PDP) devices.

SUMMARY OF THE INVENTION

In the broad context of information and communication systems many different types of touch displays may be used. Embodiments of the inventive concept provide a method of removing or reducing noise and thereby optimizing a touch response delay time. Such noise reduction/removal may be accomplished using a filter and a certain amount related computational processing that provides better recognition of the touch input and more precisely identifies a touch point associated with the touch input on a display device.

According to an aspect of the inventive concept, there is provided an adaptive digital filtering method including: storing the touch data in a buffer, estimating a signal-to-noise ratio (SNR) for the stored touch data, selecting a digital filter tap for a digital filter having plurality of filter taps based on the estimated SNR, and filtering on the touch data using the digital filter after selecting the digital filter tap.

According to another aspect of the inventive concept, there is provided a digital filtering touch controller device comprising; a touch data collection unit that stores touch data obtained from a sense channel of a touch display device, and a signal-to-noise ratio (SNR) estimation unit that estimates a SNR using the stored touch data and selects a digital filter tap of a digital filtering unit based on the estimated SNR, wherein the digital filtering unit performing digital filtering on the touch data.

According to another aspect of the inventive concept, there is provided an adaptive digital filtering touch display system comprising; a touch display that comprises a plurality of sensing channels for performing a touch sensing operation and is designed to sense changes in a plurality of sensing units disposed on the sensing channels and output a plurality of sensed touch signals, a touch controller that receives the plurality of sensed touch signals, wherein the touch controller estimates an SNR based on the plurality of sensed touch signals to adaptively adjust a digital filter order and to obtain an adaptively digital-filtered touch signal, and a display that displays the adaptively digital-filtered touch signal.

BRIEF DESCRIPTION OF THE DRAWINGS

Embodiments of the inventive concept will be more clearly understood from the following detailed description taken in conjunction with the accompanying drawings in which.

DETAILED DESCRIPTION

Certain structural and/or functional descriptions are provided in relation to exemplary embodiments of the inventive concept. However, the inventive concept may be embodied in many different forms and should not be construed as being limited to only the embodiments set forth herein. Hence, the exemplary embodiments should be considered in descriptive sense only and not for purposes of limitation. Throughout the written description and drawings, like reference numbers and labels are used to denote like or similar elements.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the inventive concept.

Spatially relative terms, such as "below" or "lower" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "below" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The inventive concept will now be described in some additional detail with reference to the accompanying drawings. Touch screen systems, touch panel systems, touch-enabled display systems, touch sensing systems, and the like are terms commonly used to describe technically related systems incorporating some type of touch display, and will hereafter be collectively and individually referred to as touch display system(s).

Figure 1:
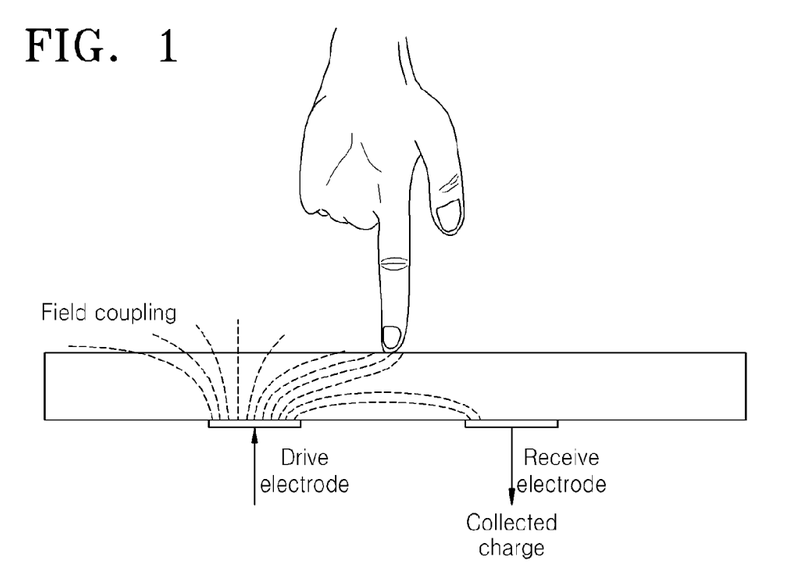
FIG. 1 conceptually illustrates a touch input being sensed by a touch display using a mutual capacitive method.

FIG. 1 illustrates an exemplary touch display device using a mutual capacitive method for detecting and discriminating a touch input that may be incorporated in a number of different touch display systems.

Referring to FIG. 1, in the mutual capacitive method, a predetermined voltage pulse is applied to a drive electrode and charges corresponding to the voltage pulse are collected in a receive electrode. If the touch input device (e.g. a person's finger) is placed between the drive electrode and the receive electrode, an electric field (indicated in FIG. 1 by the dotted lines) changes. A touch display system employing this type of touch display senses a change in the electric field between the drive electrode and the receive electrode to determine a touch point associated with the touch input and/or display the touch point on the touch display device.

Figure 2:
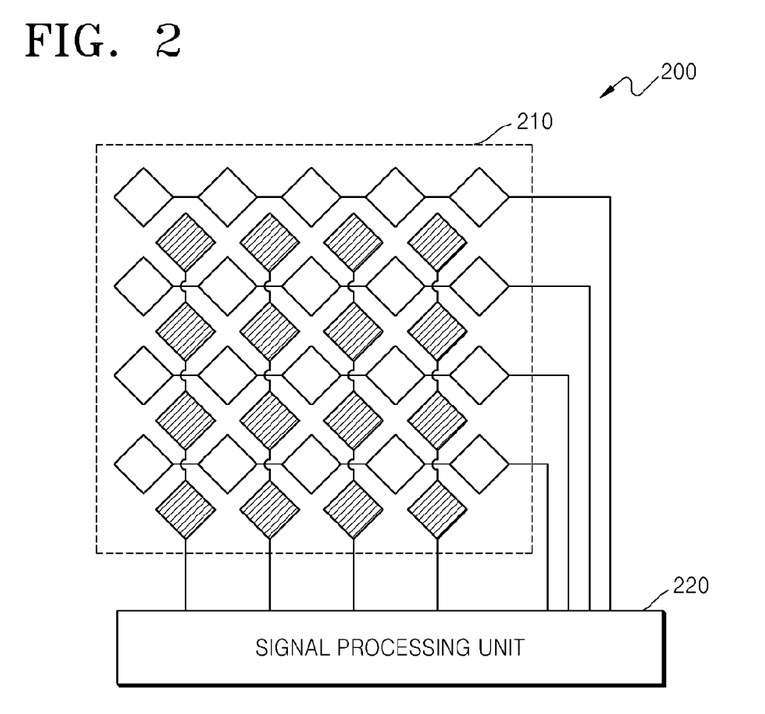
FIG. 2 illustrates a signal processing unit that processes a touch input signal generated by the touch display of FIG. 1.

FIG. 2 illustrates a signal processing unit 220 that processes a touch signal related to the touch input, as well as a touch display (e.g., a panel) 210 using a capacitive overlay method. Referring to FIG. 2, a touch display system 200 generally comprises the touch display 210 including a plurality of sensing units, and the signal processing unit 220 that senses and processes a change in capacitance detected by the plurality of sensing units and caused by an applied touch input.

The plurality of sensing units are arranged in the touch display 210 in a matrix of rows and columns. The sensing units disposed in a particular row are electrically connected to one another to form one row electrode. Similarly, the sensing units disposed in a particular column are electrically connected to one another to form one column electrode.

The signal processing unit 220 senses a change in the capacitance of at least one of the plurality of sensing units in the touch display 210 and generates corresponding touch data (or a touch input signal). For example, by sensing a change in the capacitance of each of the sensing units in the plurality of rows and in the plurality of columns, the touch display 210 may determine whether a touch input device has made contact (or near contact) with the touch display 210 and determine a corresponding touch point.

Various noise components, such as a parasitic capacitance and random noise (white noise), are present (statically or transiently) in the plurality of sensing units included in the touch display 210. If the level of these noise component(s) becomes relatively high, a change in a capacitance of the plurality of sensing units caused by a touch input becomes relatively small. That is, if one or more noise component(s) are high, touch sensitivity is correspondingly reduced.

In similar consideration, fluctuations in an electrode voltage (VCOM) applied to an upper plate of a touch display corresponding to the sensing unit leads to sensing noise during touching of the sensing unit due to a vertical parasitic capacitance. Thus, the touch display system 200 requires various filtering methods designed to remove or reduce the effects of such noise component(s). Accordingly, since a touch display system using a capacitive overlay method senses the relative size of a capacitance between an electrode pattern and a touch input device, it is very important for the touch display system to obtain a stable relatively noise-free output.

Figure 3:
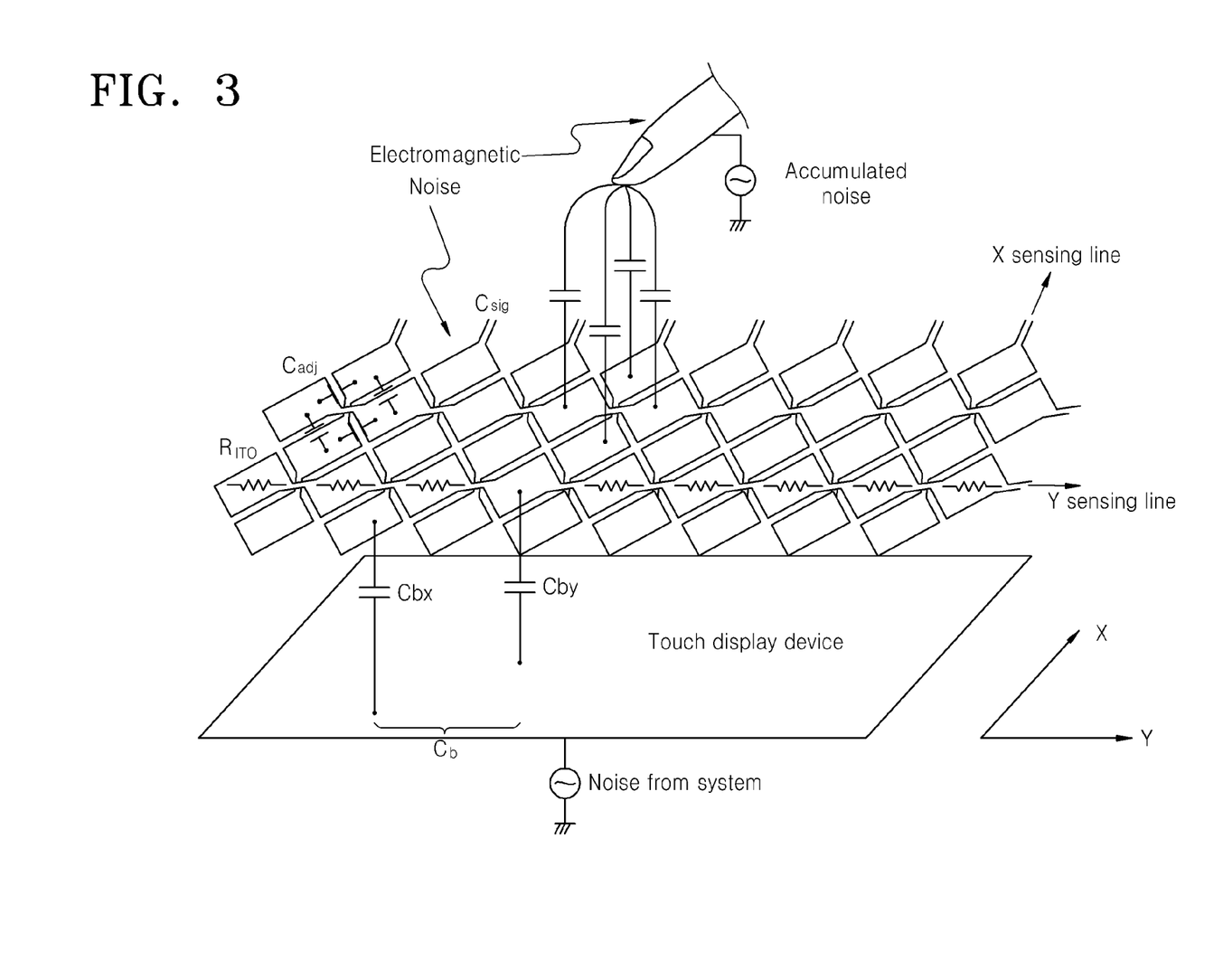
FIG. 3 illustrates several mechanisms through which electromagnetic noise is generated during the operation of the touch display of FIG. 1.

FIG. 3 further illustrates the generation and effect of electromagnetic noise associated with a touch display device.

In the context of certain conventional mobile products incorporating a touch display device, an ON-cell touch sensor seeks to reduce the number of processes and thereby improve the price competitiveness of the touch display device. However, the incorporation of a touch display device (e.g., a touch display panel) within inherently noisy mobile devices is a difficult task, and particularly in relation to the maintenance of sufficient touch input sensitivity.

That is, certain conventionally understood parasitic capacitances (e.g.,) Cbx and Cby generated between a sense channel of the touch display device and a data line of the system, as well as noise accumulated on or passed by the touch input device to the touch display device may drastically effect operation of the touch display device including the touch input detection sensitivity. As a result, fluctuation of various voltages associated with source channels applied to the display panel from (e.g.,) a display driver integrated circuit (DDI IC) may arise. The influence of noise on the ON-cell touch sensor is generally greater than that associated with other types of touch displays. Accordingly, there is a particular demand for ON-cell touch sensors having reduced noise. But this is only one example of many possible commercial applications benefiting from certain embodiments of the inventive concept.

Referring to FIG. 3, the touch display device includes a plurality of sensing units disposed in the X-axis direction and a plurality of sensing units disposed in the Y-axis direction. The sensing units disposed in the Y-axis direction are connected to X-sensing lines distributed in the X-axis direction and the sensing units disposed in the X-axis direction are connected to Y-sensing lines distributed in the y-axis direction. An electrical resistance $R_{ITO}$ is present between the X-sensing lines and the Y-sensing lines. The plurality of sensing units may be disposed near one surface of the touch display device (e.g. the panel of a touch display panel), or directly on the surface of the touch display device. A predetermined electrode voltage (VCOM) may be applied on the opposing surface of the touch display device. For example, if the touch display device is a liquid crystal display (LCD) panel, the electrode voltage VCOM may be applied as a common electrode voltage, and if the touch display device is an organic light-emitting display (OLED) panel, the electrode voltage VCOM may be applied as a direct current (DC) cathode voltage.

Parasitic capacitance components are present due to the row/column arrangement of the sensing units. For example, the parasitic capacitance components may include a horizontal parasitic capacitance $C_{adj}$ generated between adjacent sensing units, and vertical parasitic capacitances Cbx and Cby generated between the sensing units and a surface of the touch display device (e.g., a touch panel surface). If a parasitic capacitance is greater than a capacitance of a sensing unit generated when a touch input device approaches or touches a sensing unit, even if the capacitance of the sensing unit is changed by the touch input, said change is relatively small and thus touch sensitivity is reduced. Noise due to the parasitic capacitance may be reduced or minimized by using a compensation device connected to a charge amplifier of a touch controller. However, it may be difficult to reduce white noise, which is generated due to propagation interference and has the same power at all frequencies used by a touch system, by using the compensation device. In this case, white noise may be reduced by using an analog filter and a digital filter installed at a rear end of the charge amplifier.

Figure 4:
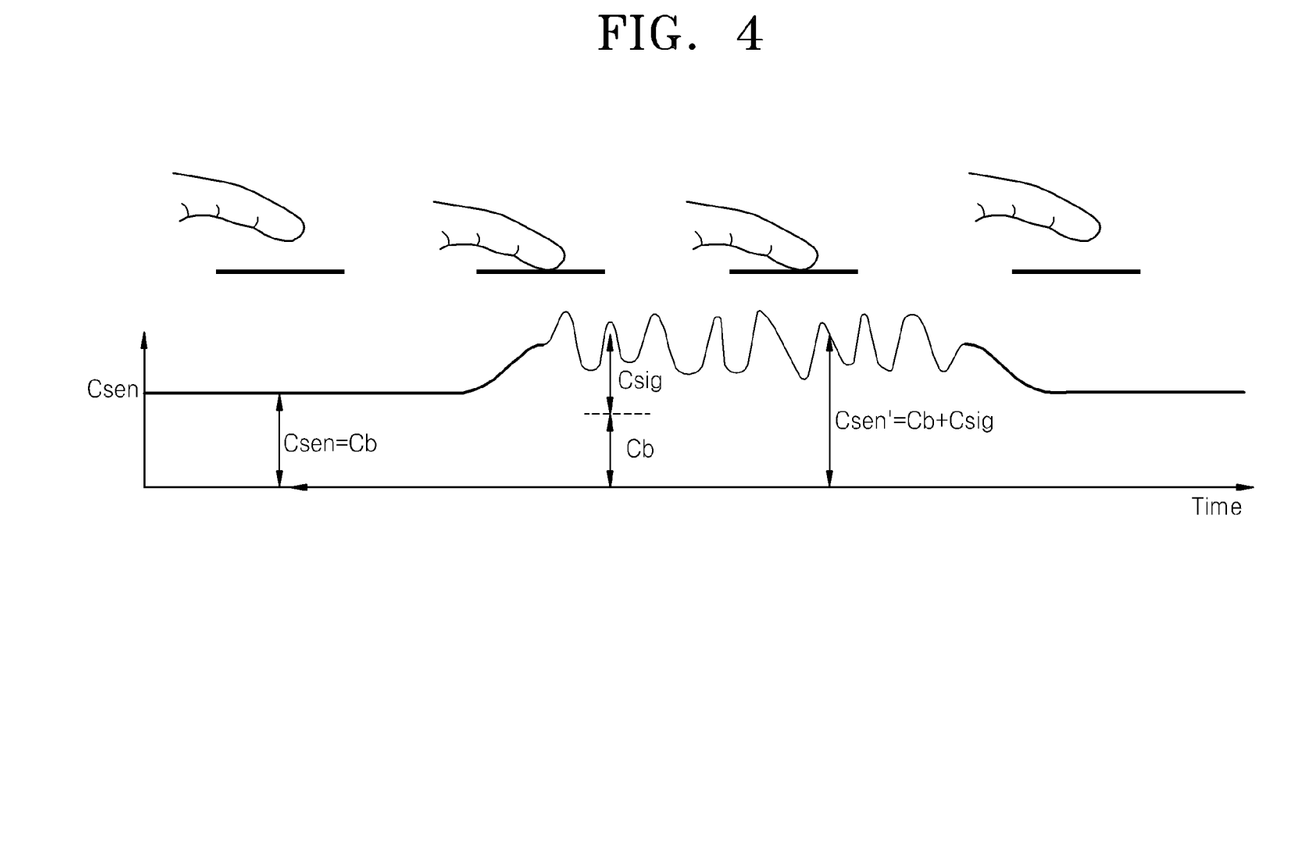
FIG. 4 is a graphical illustration of noise-induced fluctuations in a capacitive signal recognized as a touch input signal for the display device of FIG. 1.

FIG. 4 is a graphical illustration of noise-induced fluctuation due to various noise sources of a capacitance used to recognize a touch input. The symbol Cb denotes a parasitic capacitance generally present in the touch display device, and Csig denotes a capacitance associated with a touch input. A sensor output Csen in the absence of a touch input is essentially equal to the parasitic capacitance Cb, but the sensor output Csen' in the presence of the touch input increases to Cb+Csig.

In FIG. 4, the fluctuation varies in size according to the type of introduced noise. Due to such fluctuations, a touch display device may falsely recognize a touch in the absence of a touch input and/or erroneously identify (or alter) coordinates for the phantom touch input, thereby greatly degrading the sensing performance of a touch display device.

Noise may be differently generated in an LCD panel and an OLED panel. For example, if a touch display is associated with an OLED panel, a common electrode layer providing the common voltage VCOM may be located under a touch sense channel. The common electrode layer is maintained at a constant voltage by using an external switching mode power supply (SMPS). Thus, in the case of an OLED panel, the amount of noise accumulated in a touch sense channel may be very small.

However, an LCD panel may be driven using two different methods, i.e., a method of driving a common electrode with a constant voltage and a method of continuously inverting the common electrode. In the method of driving the common electrode with the constant voltage, a great deal of noise may be generated, and also in the method of continuously inverting the common electrode, a lot of noise is accumulated whenever data is written to a source channel. This is because a touch display is greatly affected by slew as well as by the data written to a source channel.

Figure 5:
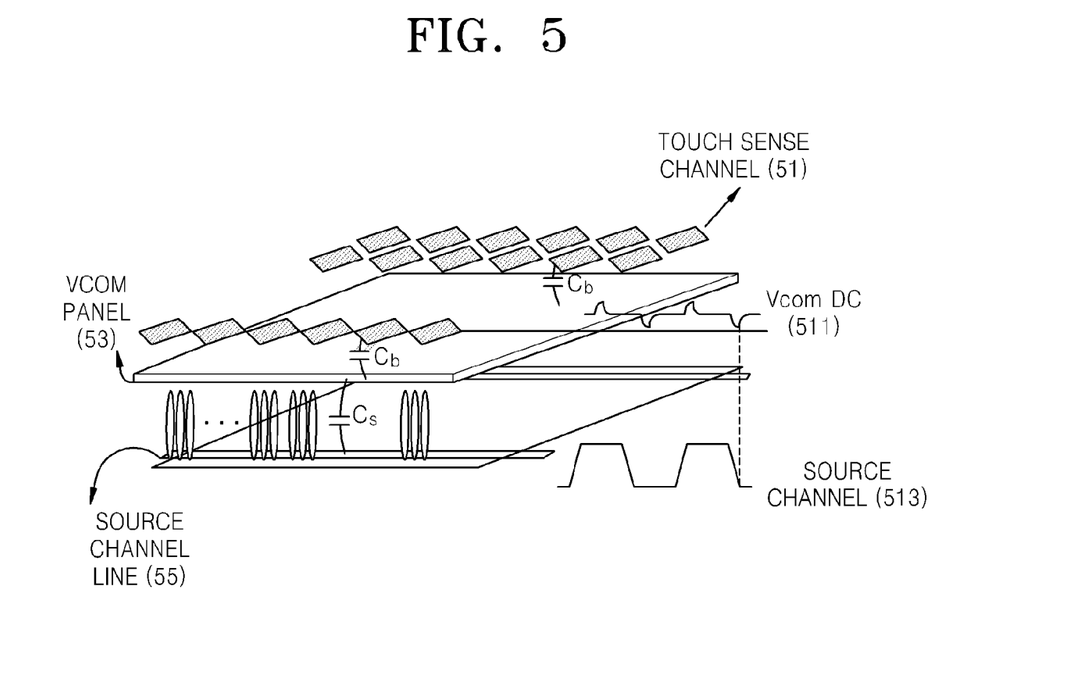
FIG. 5 further illustrates mechanisms through which electromagnetic noise is generated during the operation of the touch display of FIG. 1.

FIG. 5 illustrates the influence of noise on a touch display. In FIG. 5, according to an active level shifting (ALS) method used as one of methods of driving an LCD panel, a corresponding touch display system drives a common electrode voltage Vcom DC 511 to generate a constant voltage, and applies a boost voltage to a storage capacitor (not shown) disposed at a module side. A number of source channels 513 are disposed in an LCD quarter video graphics array (qVGA) grade panel. and noise is generated in the common electrode voltage Vcom DC 511 due to a change in the source channels 513 disposed on a source channel line 55. A parasitic capacitance $C_s$ generated between the source channel 513 and a common electrode panel 53 may be greater than 10 nF. Also, in the case of an ON-cell type device, a parasitic capacitance $C_b$ generated between a touch sense channel 51 and the common electrode channel 53 may be greater than tens of pF, which is relatively high. That is, when the plurality of source channels 513 are simultaneously activated and data is applied to the touch sense channel 51, noise accumulated in the touch sense channel 51 is relatively high. On the other hand, when the parasitic capacitance Cb is low, noise accumulated in the touch sense channel 51 is very low. Also, as voltage swing widths of the source channels 513 increase, noise components accumulated in the common electrode panel 53 increase. Since a circuit for driving a common electrode is a DDI internal block and there is a limitation in creasing the bandwidth of the DDI internal block, noise accumulated in the source channels 513 may not be stabilized within a short time.

Figure 6:
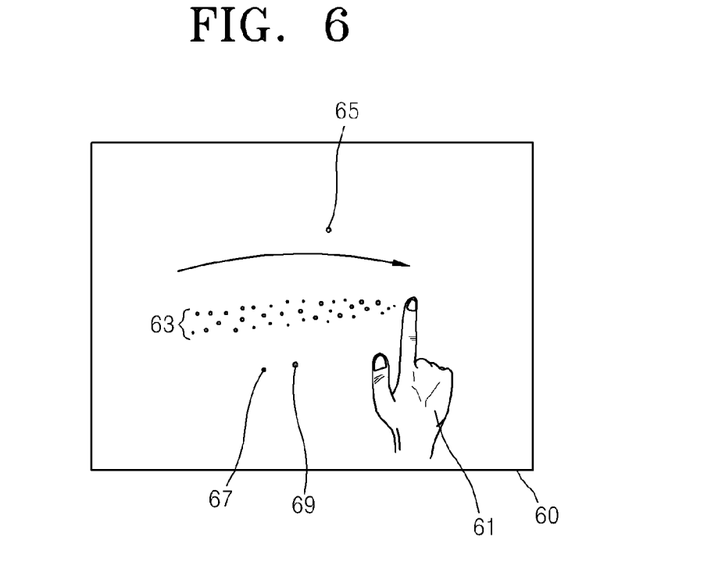
FIG. 6 illustrates a particular case wherein noise is generated during a touch input captured by touch display using a resistive overlay method.

FIG. 6 illustrates a case where noise is generated in response to a touch input applied to a resistive touch display 60.

As the touch input 61 is applied to the resistive touch display 60, touch data 63 is generated for a corresponding touch input position. If the touch input is continued, an internal processor filters the touch data 63, connects the touch data into a line, and displays the touch data on a display. However, touch data 65, 67, and 69 generated due to noise are not touch points associated with touch input 61. If a touch system erroneously recognizes the touch data 65, 67, and 69 as touch points and displays the touch data 65, 67, and 69 on the display, distortion occurs.

A predetermined reference value may be preset in the touch display so that if touch data generated by noise is quite distance from an actual touch point, the internal processor may exclude such erroneous touch data from the touch data. However, if such distance touch data is excluded based on a relatively small reference value, the touch system may not recognize an instant change in actual touch input data.

Accordingly, if touch data is filtered by using a digital filter, a touch line may be smoother and coordinates for the actual touch points may be more precisely reflected than a case where touch data is filtered using an analog filter.

However, if the touch system is changed from a non-touch state to a touch state and thus a signal level is changed, the degree of a change in touch is not rapidly reflected by the touch system and the touch is recognized after there is a delay for the digital filter to reach a threshold. If the digital filter always has a fixed order, a response delay time is fixed irrespective of a signal-to-noise ratio (SNR).

As a digital filter order increases, such digital filtering obtains a smoother touch line, and a trace most similar to an actual trace of touch points may be displayed. However, if the digital filter order is increased when the touch system performs digital filtering, the touch system may not appropriately respond to a sudden change in touch and the characteristics of previous touch data are excessively reflected, and thus delayed or distorted touch coordinates are output. Such filter delay factors degrade an initial touch recognition rate and the accuracy of touch gesture recognition such as handwriting recognition.

Accordingly, if the digital filter order is dynamically adjusted by reflecting a noise level in the touch system, the filtering effect may be maximized and response delay factors of the digital filter may be minimized. If an adaptive digital filter is applied to the touch system, the digital filter order may be changed according to a touch motion. The digital filter order may be increased to minimize a coordinate jitter due to noise when a touch is continued at a fixed position, and may be increased to adaptively compensate for a response delay time according to a speed at which a touch moves. However, even in this case, the touch display system may not compensate for an initial touch delay time according to an SNR, and noise reduction due to the digital filter is degraded while a conductive object moves, thereby increasing the risk of an error in output coordinates.

Accordingly, a more efficient touch display system may be realized by dynamically estimating an SNR of a touch input signal, determining an appropriate digital filter order, and adjusting an output coordinate jitter. An SNR and a touch coordinate jitter according to the digital filter order may be stored in the touch display system to dynamically respond to noisy environments.

Figure 7:
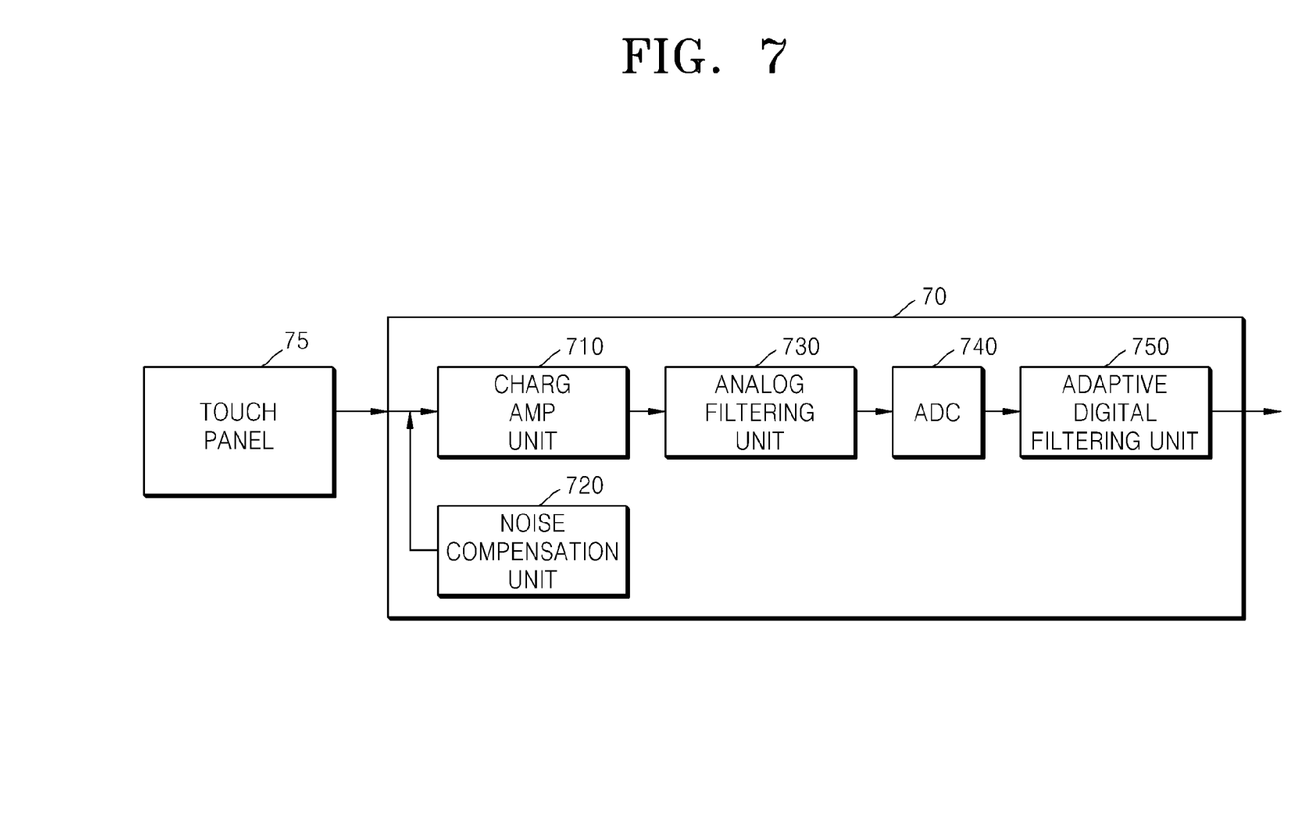
FIG. 7 is a block diagram illustrating a touch display system including a touch controller connected to a touch panel according to an embodiment of the inventive concept.

FIG. 7 is a block diagram illustrating a touch display (e.g., touch panel) 75 and a touch controller 70 connected to the touch display 75 according to an embodiment of the inventive concept.

In the touch controller 70, touch data received from the touch display 75 is input to a charge amplifier unit 710. A noise compensation unit 720 is used to compensate for noise generated due to a parasitic capacitance or similar noise. The touch data after having passed through the charge amplifier unit 710 passes through an analog filtering unit 730, is sent to an analog-to-digital conversion unit 740, and is converted into corresponding digital data by the analog-to-digital conversion unit 740. The digital data is then filtered using an adaptive digital filtering unit 750.

If a digital filter has a fixed digital filter order, a response delay time corresponding to a touch is fixed irrespective of fluctuation of an SNR according to a change in various ambient conditions. If the SNR is high, since the digital filter order is fixed, excessive filtering is performed, thereby degrading the performance of a system. Also, if the SNR is low and more accurate filtering is necessary, sufficient filtering may not be performed due to the fixed digital filter order, thereby failing to ensure stability of output touch coordinates. If the SNR is dynamically estimated, an appropriate digital filter order may be determined. If a digital filter order is changed in real time in accordance with a touch, a sufficient filtering effect may be achieved and performance degradation due to a delay by the digital filter may be minimized.

Figure 8:
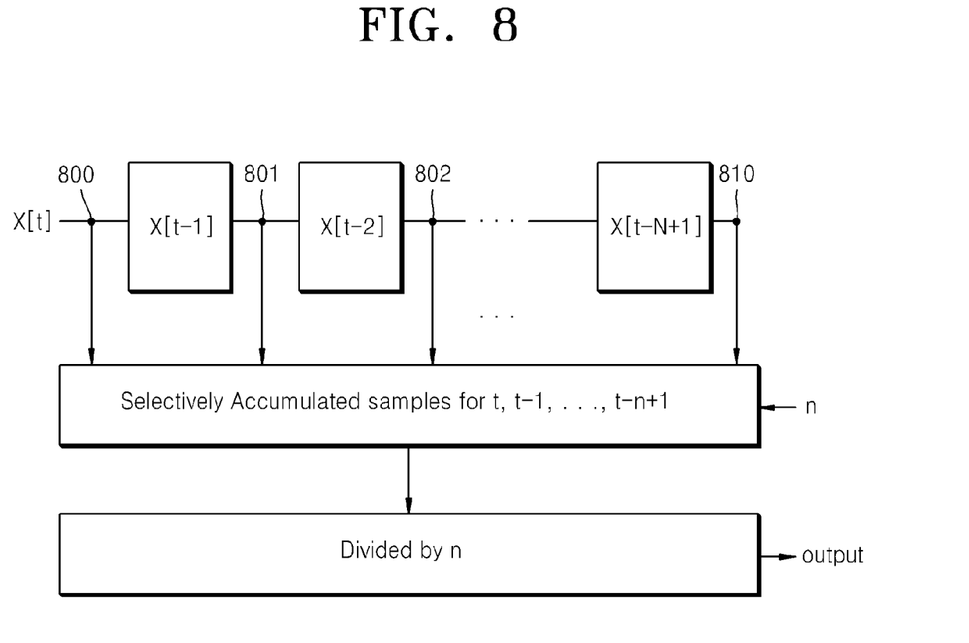
FIG. 8 further illustrates the adaptive digital filter of FIG. 7 according to an embodiment of the inventive concept.

FIG. 8 illustrates one possible example of an adaptive digital filter according to an embodiment of the inventive concept. A series of operations associated with the adaptive digital filter of FIG. 8 may be performed in the adaptive digital filtering unit 750 of FIG. 7.

A digital filter may be structured to dynamically adjust its filter order. If a general moving average filter is used, a structure like the one shown in FIG. 8 may be adopted. The structure of FIG. 8 is a structure for a single sensing channel of a touch display, and a touch system is to employ a parallel structure proportional to the number of used channels. For example, a touch display using 15X channels and 15Y channels may perform an average filter operation that is 80 times greater than that of the digital filter shown in FIG. 8.

In FIG. 8, a maximum digital filter tap number (order) of the digital filter is N−1, N−1 pieces of touch data x[t], x[t−1], . . . , x[t−N+1] input according to time may be stored in a memory or storage device, and touch data is accumulated according to an order determined by an SNR estimation unit, and an average value of the touch data is obtained. In order for the touch system to dynamically change the digital filter order, N−1 previous sample touch data are always to be stored.

If the touch display system reflects the touch data x[t] in FIG. 8 as it is—that is, if the touch system selects a point 800 within the digital filter order, the touch data x[t] may be output without digital filtering.

If point 801 is selected within the digital filter order, two pieces of touch data x[t] and x[t−1] are used (i.e., n=2), and a value obtained by selecting only the touch data x[t] and x[t−1] from among the touch data x[t], x[t−1], . . . , x[t−N+1] and dividing a sum of the touch data x[t] and x[t−1] by 2 is output. If point 802 is selected, the digital filter order is 2 and n=3. In the same manner, only the touch data x[t], x[t−1], and x[t−2] are selected from among the touch data x[t], x[t−1], . . . , x[t−N+1] and a sum of the touch data x[t], x[t−1], and x[t−2] is divided by 3 to output an average value. Finally, if point 810 is selected, the digital filter order is N−1, where "N" is a natural number and n=N−1, and a value obtained by dividing a sum of all of the touch data x[t], x[t−1], . . . , x[t−N+1] by N may be output. A detailed description of the adaptive digital filter order determination will be given in relation to the method summarized in FIG. 9.

Figure 9:
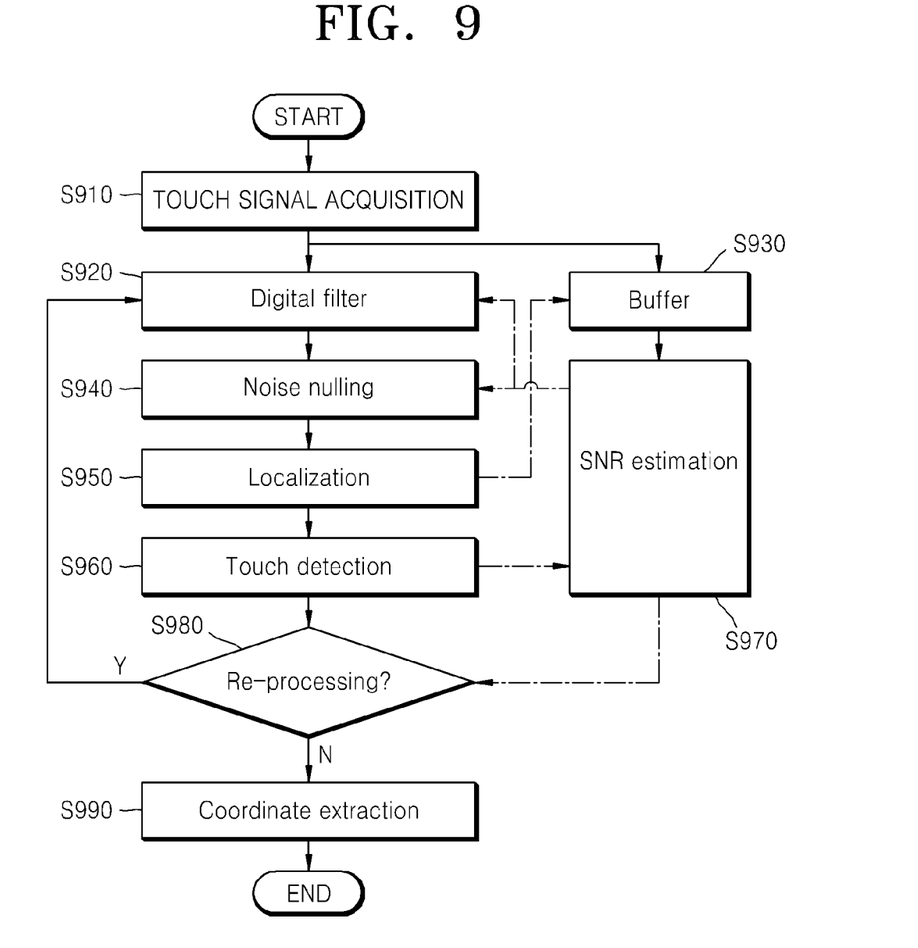
FIG. 9 is a flowchart summarizing one exemplary operation for an adaptive digital filter in a touch display system according to an embodiment of the inventive concept.

FIG. 9 is a flowchart summarizing a method of operating an adaptive digital filter within a touch display system according to an embodiment of the inventive concept.

First, when a touch input is applied to the a touch display device, one or more sensing unit(s) within the touch display device senses the touch input and acquires corresponding touch data (S910). Noise is removed from the acquired touch data using the adaptive digital filter (S920). Only effected sense channels sensing the applied touch input are used to group corresponding touch data, and the resulting acquired touch data is stored in a buffer (S930). Although the present example assumes that touch data is stored by adding up local signals, the inventive concept may be used in systems acquiring touch data in any reasonable manner. In general, touch data is not only present in a single channel but at least two or more adjacent channels. Accordingly, in order to more precisely estimate a SNR, a signal level and a noise level are evaluated using a sum of distributed channel signals. For example, it is assumed that if X channel data is {0, 5, 15, 26, 7, 0} and Y channel data is {12, 35, 14, 2, 0, 0}, the size of an effective distribution is 3. Channel signals stored in the buffer are selected according to the size of the effective distribution in X and Y channels and a sum of the channel signals is [(15+26+7)+(12+35+14)]=109. Touch data calculated and stored in this manner has a data length $N_{CE}$. Here, $N_{CE}$ is a data length of the channel data stored in the buffer. According to a user's selection, previous data having a data length $N_{CE}$ of 10 may be continuously stored or previous data having a data length $N_{CE}$ of 50 may be continuously stored.

Next, a noise nulling unit sets touch data having a value lower than a predetermined noise level reference value (or a noise nulling reference value) to null ("0") from among the touch data filtered by the digital filter (S940). The noise nulling unit corrects touch data having a value less than a noise level reference value from among touch data having non-zero values to "0".

For example, when touch data is {0, 5, 15, 26, 7, 0}, if a noise level reference value is determined to be 6 by the SNR estimation in operation S970, the touch data {0, 5, 15, 26, 7, 0} is readjusted to {0, 0, 15, 26, 7, 0} by noise nulling. If a noise level reference value is 8, the touch data {0, 5, 15, 26, 7, 0} is readjusted to {0, 0, 15, 26, 0, 0}. The SNR estimation unit changes a noise level reference value according to a given SNR level, and the noise nulling unit readjusts touch data by using the changed noise level reference value.

Next, the touch system obtains localization information (S950), and determines whether a touch input has occurred to obtain touch detection information (S960).

A channel estimation unit then fetches the previous touch data from the buffer, collects the localization information and the touch detection information, and estimates an SNR (S970).

The SNR may be estimated according to equations 1-4 below:

$$NoiseLevel = \sqrt{\frac{\sum_{i=0}^{N_{CE}-1}(S_i - \mu_s)^2}{N_{CE}}} \quad \text{[Equation 1]}$$

$$SNR = 20\log(\mu_s / NoiseLevel) \quad \text{[Equation 2]}$$

In Equation 1, "Si" is total sum of touch data stored in the buffer. For example, if touch data in the X-axis is {0, 0, 15, 26, 7, 0} and touch data in the Y-axis is {12, 35, 14, 0, 0, 0}, Six=(15+26+7), Siy=(12+35+14), and Si=Six+Siy=109.

The value $\mu_s$ is an average value of $N_{CE}$ pieces of the touch data. For example, if $N_{CE}$=4, Si=50, $S_{i+1}$=52, $S_{i+2}$=55, and $S_{i+3}$=47, $\mu_s$=(50+52+55+47)/4=51.

According to Equation 2, an SNR may be obtained by estimating a relative value corresponding to a previous state. An SNR may instead be obtained without calculating a square root and a log as shown in Equations 3 and 4.

$$NoiseLevel^* = \frac{\sum_{i=0}^{N_{CE}-1}(S_i - \mu_s)^2}{N_{CE}} \quad \text{[Equation 3]}$$

$$SNR^* = \mu_s^2 / NoiseLevel^* \quad \text{[Equation 4]}$$

Once the SNR or the SNR* is estimated as shown in Equations 2 or 4, the touch system determines an optimal digital filter order and an optimal noise nulling level by using a pre-characterized lookup table.

In order to dynamically estimate a channel state and determine a digital filter order and a nulling level in this manner, it must be ascertained that the touch data stored for a period of the data length $N_{CE}$ is touch data acquired during a stable touch state. Accordingly, estimation conditions for estimating an SNR suggested by the foregoing embodiments of the inventive concept are as follows:

(1) a touch input applied state is to be maintained during the period of the data length $N_{CE}$ where the touch data is stored, (2) a state transition is to not occur during the period of the data length $N_{CE}$ where the touch data is stored, and (3) a maximum jitter, from an average value, in coordinates of the touch data collected during the period of the data length should be less than Dmax, that is, a preset value.

The estimation condition (2) means that sample touch data during a period where a non-touch state of a conductive object changes to a maximum touch state and sample touch data during a period where a touch state changes to a non-touch state should not be stored in the buffer. If the above estimation conditions are not satisfied, the buffer is re-initialized and touch data is re-collected.

Also, the touch system does not estimate an SNR while the touch data is stored during a period of the data length $N_{CE}$.

The above estimation conditions may be appropriately adjusted according to the structure and number of electrodes of the touch display. For example, a deviation of touch data in a specific touch display may be very high according to a contact position between a conductive object and an electrode. In this case, the touch system may estimate a sense channel state more precisely only when all of the estimation conditions (1), (2), and (3) are satisfied. That is, due to the estimation condition (3), the touch system estimates an SNR when a conductive object is touched and is rarely moved. In the case of a touch display with a small deviation of touch data, the touch system may effectively estimate an SNR even though the estimation condition (3) is not satisfied. That is, the touch system may estimate an SNR while the conductive object is moved, by using only the estimation conditions (1) and (2). In the case of a touch display with a large deviation of touch data according to a position, the touch system may use the estimation condition (3) and may not use touch coordinates exceeding the preset value Dmax to calculate an SNR.

Referring back to FIG. 8, it must now be determined whether a current digital filter order is not appropriate based on the estimated SNR and re-processing (S980) to return the digital filtering step (S920) needs to be performed according to parameters determined by a channel estimation unit. If it is determined (S980=YES) that re-processing needs to be performed, the method returns to the digital filtering step (S920) to perform digital filtering by using the digital filter. If, however, it is determined (S980=NO) that the current digital filter order is appropriate and re-processing does not need to be performed, the method advances, and touch input coordinates are extracted (S990). If a digital filter order is always determined by using previous touch data, feedback from operation 5980 to 5920 is not necessary, and a channel estimation result may be applied to next sample touch data. In this case, a time delay for performing re-processing on touch data does not occur.

Figure 10:
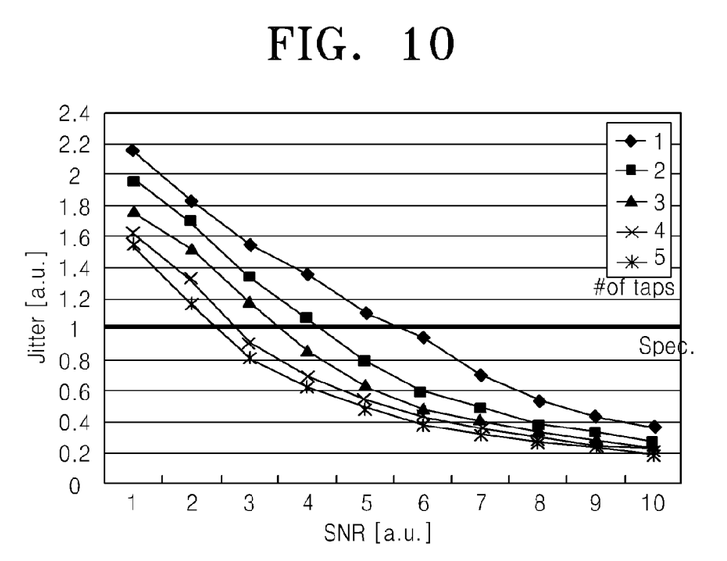
FIG. 10 is a graph of the type that may be used to determine a digital filter order according to a signal to noise (SNR) estimation according to an embodiment of the inventive concept.

FIG. 10 is a graph of the type that may be used to determine a digital filter order according to an SNR estimation according to an embodiment of the inventive concept. An operation of determining a digital filter order according to an SNR estimation may be performed, for example, by the SNR estimation unit of FIGS. 9 and 11.

In FIG. 10, the y-axis represents the degree of jitter in coordinates when a conductive object continuously touches one point of a touch display. Values in the y-axis indicating the degree of jitter are normalized values through experiments. The x-axis represents an SNR, and values in the x-axis are also normalized values. Five curves are shown according to digital filter tap numbers. The digital filter tap numbers indicate 5 types. Simply, a curve 5 has a digital filter order higher than that of a curve 1.

For example, let's assume that a touch system standard specification requires that a jitter be equal to or less than 1. If an SNR is 3, from among the 5 curves, two curves having digital filter tap numbers 4 and 5 have a jitter equal to or less than 1. For an optimal performance, the touch system selects the digital filter tap number=4 and performs digital filtering. If an SNR is 4, three curves having digital filter tap numbers 3, 4, and 5 have a jitter equal to or less than 1, and the touch system optimally selects the digital filter tap number=3. If an SNR is 5, an optimal performance may be expected when the touch system selects the digital filter tap number=2.

If the standard specification requires that a jitter be equal to or less than 0.8, the number of available digital filter tap numbers may be more than that in cases where a jitter is to be equal to or less than 1. For example, if an SNR is 4, a digital filter tap number should be 4. On the contrary, if the standard specification requires that a jitter be equal to or less than 1.2, the number of available digital filter tap numbers may be less than that in cases where a jitter is to be equal to or less than 1. According to the graph, if an SNR is 3, a digital filter tap number may be 3.

A touch system according to an embodiment of the inventive concept may adjust a noise nulling level according to an SNR like a digital filter. Noise nulling may reduce the degree of jitter in coordinates, but degrades the accuracy of extracted touch coordinates. Accordingly, if a channel environment may satisfy a condition for a jitter required by the standard specification, which may be a target threshold for the accuracy of a product, the noise nulling level in the touch system is to be set to be close to 0. In this channel environment, for signal accuracy, most of signals may be retained without being set to null, so as to be reflected in digital filtering. This is because if an original signal value is removed by nulling, signal accuracy is lowered. In this case, the noise nulling level is determined so as to satisfy a condition for a jitter required by the standard specification according to a digital filter order and a result of channel estimation. For example, even if a maximum digital filter tap number is selected when an SNR is very low, if the condition for the jitter required by the standard specification is not satisfied, the jitter may be reduced by increasing the noise nulling level. Accordingly, the touch display system may adjust the noise nulling level as well as adaptive digital filtering in this manner.

A coordinate jitter according to a digital filter order and an SNR are previously stored in the touch display system, so as to dynamically respond to a noise environment.

Figure 11:
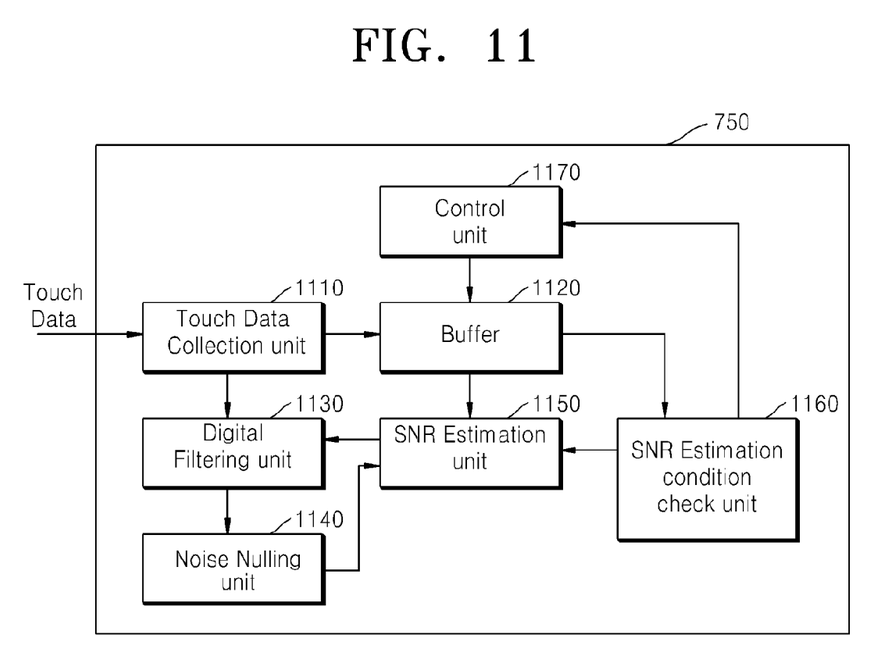
FIG. 11 is a block diagram of a digital filtering unit according to an embodiment of the inventive concept.

FIG. 11 is a more detailed block diagram of the adaptive digital filtering unit 750 according to an embodiment of the inventive concept.

In certain embodiments of the invention concept the adaptive digital filtering device 750 corresponds to the adaptive digital filtering unit of FIG. 7. Since most operations of the adaptive digital filtering device 750 have been described above, the operation of each unit will be explained only briefly.

Touch data is collected through a sensing channel of a touch display by a touch data collection unit 1110 and is stored in a buffer 1120. At this time, a plurality of touch data is stored by using localization information for next SNR estimation. Also, the touch data is initially filtered by a digital filtering unit 1130. The digital filtering by the digital filtering unit 1130 is optional. A noise nulling unit 1140 sets to null only data having a value less than a noise level reference value from among the touch data. An SNR estimation unit 1150 estimates an SNR by referring to current touch data and the previous touch data obtained from the buffer 1120. If a touch display system needs to perform re-processing, that is, if a digital filter order and a nulling reference value (a noise level reference value) need to be re-adjusted, the digital filter order and the nulling reference value are re-adjusted by using the touch data collection unit 1110, the digital filtering unit 1130, and the noise nulling unit 1140. If a delay time necessary for the re-processing is not allowed, a changed digital filter order and a changed nulling reference value are used for next touch data, and not for the current touch data.

In order to estimate the SNR, an SNR estimation condition check unit 1160 checks estimation conditions, and if the estimation conditions are not satisfied, the buffer 1120 is reset by a control unit 1170.

Figure 12:
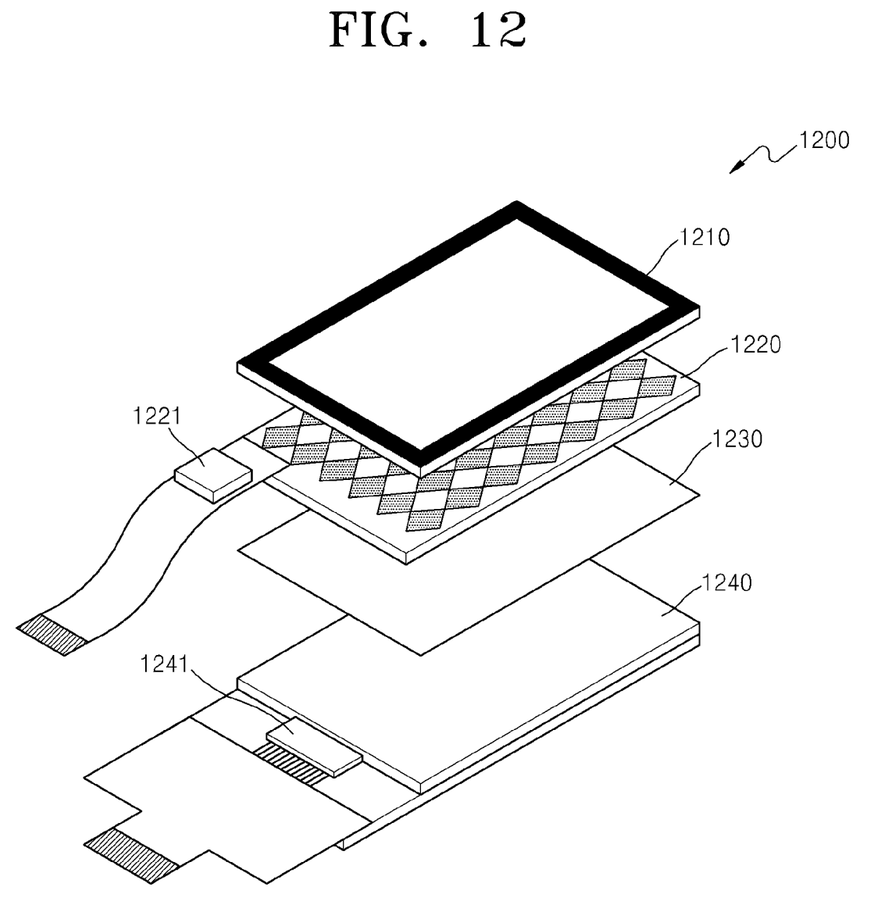
FIG. 12 is an exploded perspective view of a printed circuit board (PCB) of a touch display device (e.g., a flat touch screen) in which a touch controller is installed according to an embodiment of the inventive concept.

FIG. 12 is an exploded perspective view of a printed circuit board (PCB) of a touch display device 1200 in which a touch controller 1221 is installed, according to an embodiment of the inventive concept. The touch display device 1200 may include a window glass 1210, a touch display 1220, and a display panel 1240. A polarization plate 1230 may be further disposed between the touch display 1220 and the display panel 1240 so as to provide optical characteristics.

The touch controller 1221 may be mounted as a flexible printed circuit board (FPCB) in the form of a chip on board (COB) connected between the touch display 1220 and a main board.

The window glass 1210 is generally formed of acryl, tempered glass, or the like and protects a module from being scratched due to an external impact or a repeated touch. The touch display 1220 is formed by patterning a transparent electrode formed of, for example, indium tin oxide (ITO), on a polyethylene terephthlate (PET) film or a glass substrate. The touch controller 1221 senses a change in a capacitance from each electrode, extracts touch coordinates, performs adaptive digital filtering, and provides filtered touch data to a host controller. The display panel 1240 is generally formed by attaching two pieces of glass as an upper plate and a lower plate. In general, a display driving circuit 1241 is attached in the form of a chip on glass (COG) to the display panel 1240 for a mobile device.

Alternatively, a touch control unit and a display driving unit may be integrated in one semiconductor chip.

Figure 13:
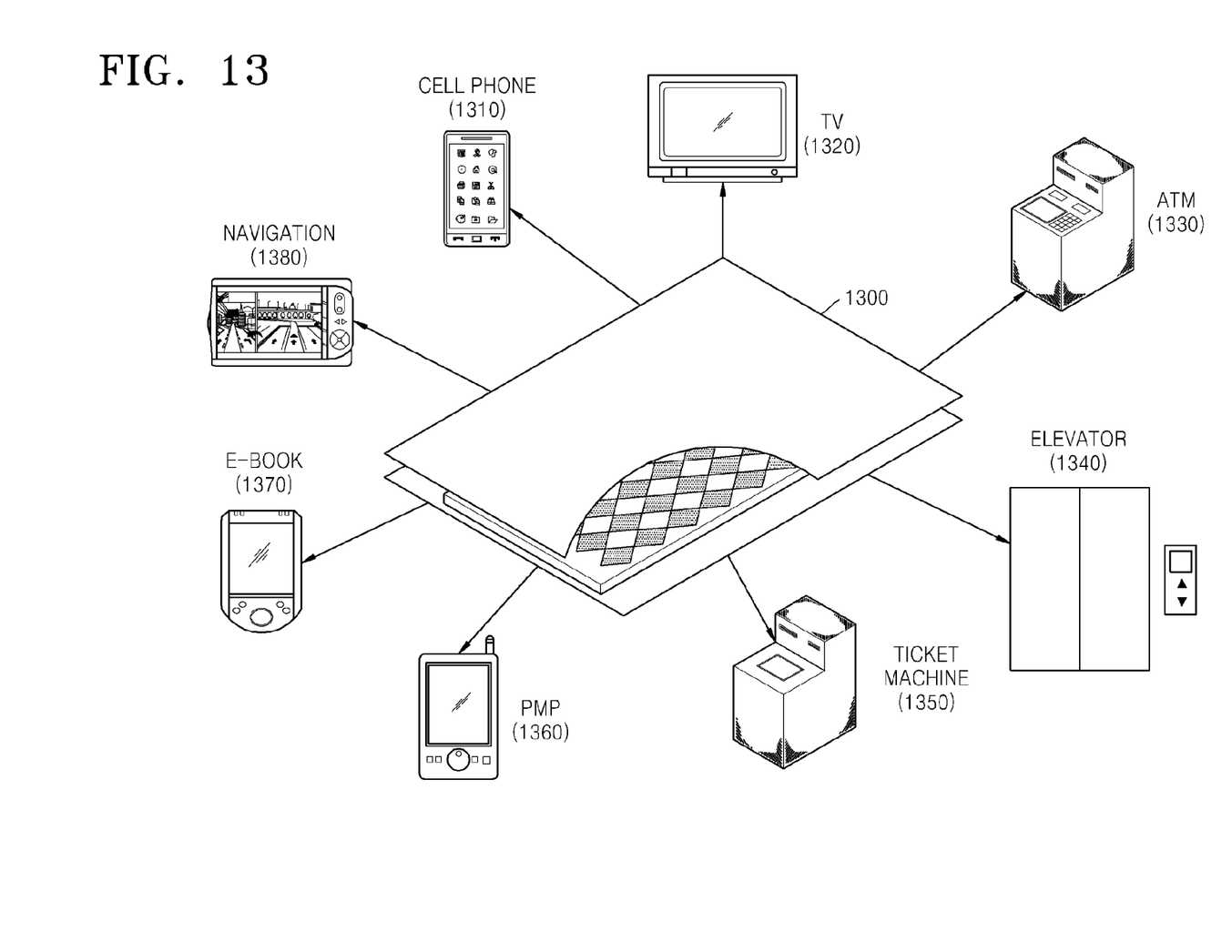
FIG. 13 illustrates various products in which a touch display system may be installed according to certain embodiments of the inventive concept.

FIG. 13 illustrates various applications for a touch display system 1300 according to an embodiment of the inventive concept.

Currently, products including a touch screen are widely used in various fields, and are rapidly replacing button-based devices due to their superior spatial characteristics. The most explosive demand is in the field of mobile phones. In particular, since convenience and the size of a terminal are very important in mobile phones, touch phones that do not include additional keys or minimize the number of keys have recently come into the spotlight. Accordingly, the touch display system 1300 may be used in a cell phone 1310, a television (TV) 1320 including a touch screen, an automatic teller machine (ATM) device 1330, which allows for cash withdrawal and remittance, an elevator 1340, a ticket machine 1350 used in a subway and the like, a portable multimedia player (PMP) 1360, an e-book 1370, a navigation device 1380, and so on. Besides, a touch display device is rapidly replacing a general button-based interface in all fields requiring a user interface.

As described above, the adaptive digital filtering method and apparatus according to the inventive concept may minimize a response delay time due to a filter and the amount of computation by dynamically adjusting a noise removal level.

While the inventive concept has been particularly shown and described with reference to exemplary embodiments thereof using specific terms, the embodiments and terms have been used to explain the inventive concept and should not be construed as limiting the scope of the inventive concept defined by the claims. The preferred embodiments should be considered in a descriptive sense only and not for purposes of limitation. Therefore, the scope of the inventive concept is defined not by the detailed description of the inventive concept but by the appended claims, and all differences within the scope will be construed as being included in the inventive concept.

What is claimed is:

1. An adaptive digital filtering method for touch data acquired in a touch display device including a plurality of sense channels in a touch system, the method comprising:
storing the touch data in a buffer;
prestoring signal-to-noise ratio (SNR) and coordinate jitter values according to digital filter order in a memory;
estimating a SNR for the stored touch data;
selecting a digital filter tap for a digital filter having a plurality of filter taps by comparing the prestored SNR with the estimated SNR and comparing the prestored coordinate jitter values with a preset standard jitter specified for the touch system;
filtering the touch data using the digital filter after selecting the digital filter tap;
after estimating of the SNR, determining a noise level reference value based on the estimated SNR; and
performing noise nulling on stored touch data having a value less than the noise level reference value,
wherein the noise level reference value is determined such that the estimated SNR satisfies a condition for the preset standard jitter, and
wherein the selecting a digital filter tap for a digital filter having a plurality of filter taps comprises selecting a smaller number of digital filter taps as the estimated SNR increases.

2. The method of claim 1, further comprising:
determining a noise level value for a preset sampling length using touch data continuously stored during a period of the preset sampling length, wherein the SNR is estimated in accordance with the determined noise level value.

3. The method of claim 2, further comprising:
defining estimation conditions for estimating of the SNR, such that a touch state during which a touch input is applied to the touch display device is maintained during the period of the preset sampling length during which the touch data is stored, and a state transition between the touch state and a non-touch state during which the touch input is not applied to the touch display device does not occur during the period of the preset sampling length.

4. The method of claim 3, wherein defining the estimation conditions for estimating the SNR further comprises:
defining that a maximum jitter from an average value for coordinates defined on the touch display device and associated with the touch data as collected during the period of the preset sampling length is to be less than a reference value.

5. The method of claim 3, wherein upon determining that the estimation conditions for estimating the SNR are not satisfied, estimating the SNR by reinitializing the buffer storing the touch data and restoring touch data in the buffer.

6. The method of claim 1, wherein the prestored SNR and coordinate jitter values are prestored in a pre-characterized lookup table within the memory.

7. A digital filtering touch controller device for a touch system comprising:
a touch data collection unit that stores touch data obtained from a sense channel of a touch display device; and
a signal-to-noise ratio (SNR) estimation unit that prestores SNR and coordinate jitter values according to digital filter order in a memory, estimates a SNR using the stored touch data, determines a noise level reference value based on the estimated SNR, performs noise nulling on stored touch data having a value less than the noise level reference value, and selects a digital filter tap of a digital filtering unit by comparing the prestored SNR with the estimated SNR and comparing the prestored coordinate jitter values with a preset standard jitter specified for the touch system,
wherein the digital filtering unit performing digital filtering on the touch data after selecting the digital filter tap, and the noise level reference value is determined such that the estimated SNR satisfies a condition for the preset standard jitter, and
wherein the SNR estimation unit selects a smaller number of digital filter taps for the digital filtering unit as the estimated SNR increases.

8. The digital filtering touch controller device of claim 7, wherein the SNR estimation unit determines a noise level value in a preset sampling length using touch data continuously stored during a period of the preset sampling length, and calculates the SNR from the determined noise level value.

9. The adaptive digital filtering touch controller device of claim 8, further comprising:
an SNR estimation condition check unit that determines whether a touch state during which a touch input is applied to the touch display device is maintained during the period of the preset sampling length during which the touch data is stored, and whether a state transition between the touch state and a non-touch state during which the touch input is not applied to the touch display device has occurred during the period of the preset sampling length.

10. The adaptive digital filtering touch controller device of claim 9, wherein the SNR estimation condition check unit further determines whether a maximum jitter derived from an average value for coordinates on the touch display device and associated with the touch data during the period of the preset sampling length is less than a reference value.

11. The adaptive digital filtering touch controller device of claim 9, further comprising:
a control unit that reinitializes a buffer in the touch data collection unit storing the touch data if at least one estimation condition used during the estimating of the SNR is not satisfied.

12. The adaptive digital filtering touch controller device of claim 7, wherein the prestored SNR and coordinate jitter values are prestored in a pre-characterized lookup table within the memory.

13. An adaptive digital filtering touch display system comprising:
a touch display that comprises a plurality of sensing channels for performing a touch sensing operation and is designed to sense changes in a plurality of sensing units disposed on the sensing channels and output a plurality of sensed touch signals;
a touch controller that prestores signal-to-noise (SNR) and coordinate jitter values according to digital filter order in a memory, receives the plurality of sensed touch signals, derives touch data from the plurality of sensed touch signal and stores the touch data in a buffer, estimates a SNR for the stored touched data, selects a digital filter tap for a digital filter having a plurality of filter taps by comparing the prestored SNR with the estimated SNR and comparing the prestored coordinate jitter values with a preset standard jitter specified for the touch display system, determines a noise level reference value such that the estimated SNR satisfies a condition for the preset standard jitter, performs noise nulling on stored touch data having a value less than the noise level reference value, and filters the stored touch data using the digital filter after selecting the digital tap filter to generate an adaptively digital-filtered touch signal; and a display that displays the adaptively digital-filtered touch signal, wherein the touch controller selects a smaller number of digital filter taps for the digital filter as the estimated SNR increases.

\* \* \* \* \*